United States Patent
Na et al.

(10) Patent No.: US 8,660,053 B2
(45) Date of Patent: Feb. 25, 2014

(54) METHOD FOR RECEIVING AND TRANSMITTING MBMS SERVICE, TERMINAL FOR RECEIVING MBMS SERVICE, AND NETWORK FOR TRANSMITTING MBMS SERVICE

(75) Inventors: Jee Hyeon Na, Daejeon (KR); Dae Ik Kim, Daejeon (KR); Chul Park, Daejeon (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 130 days.

(21) Appl. No.: 13/335,834

(22) Filed: Dec. 22, 2011

(65) Prior Publication Data

US 2012/0163273 A1    Jun. 28, 2012

(30) Foreign Application Priority Data

Dec. 23, 2010    (KR) .................. 10-2010-0134093

(51) Int. Cl.
*H04H 20/71* (2008.01)
*H04W 4/00* (2009.01)

(52) U.S. Cl.
USPC ........................................ 370/312; 370/328

(58) Field of Classification Search
None
See application file for complete search history.

(56) References Cited

U.S. PATENT DOCUMENTS

| 2010/0080159 | A1  | 4/2010  | Hu et al.        |         |
|--------------|-----|---------|------------------|---------|
| 2010/0284319 | A1* | 11/2010 | Wang et al. ...... | 370/312 |
| 2010/0322135 | A1* | 12/2010 | Van Lieshout et al. ...... | 370/312 |
| 2011/0243056 | A1* | 10/2011 | Jen ................ | 370/312 |
| 2011/0274027 | A1* | 11/2011 | Cai et al. ........ | 370/312 |
| 2011/0275363 | A1* | 11/2011 | Kwon et al. ...... | 455/422.1 |
| 2012/0009947 | A1* | 1/2012  | Lee et al. ........ | 455/456.3 |
| 2012/0039229 | A1* | 2/2012  | Etemad et al. .... | 370/312 |
| 2012/0039233 | A1* | 2/2012  | Kim et al. ....... | 370/312 |
| 2012/0044850 | A1* | 2/2012  | Wang ............. | 370/312 |
| 2012/0213161 | A1* | 8/2012  | Maeda et al. ..... | 370/328 |

FOREIGN PATENT DOCUMENTS

KR    1020100099036    9/2010

* cited by examiner

*Primary Examiner* — Clemence Han
(74) *Attorney, Agent, or Firm* — Nelson Mullins Riley & Scarborough LLP; Anthony A. Laurentano, Esq.; Lewis Lee, Esq.

(57) ABSTRACT

Disclosed is a method for receiving MBMS services from a base station supporting multi-carriers, including: receiving first system information including information on all the carriers; receiving second system information including information on multi-carriers supported by the base station; receiving MBMS control information through an MBMS control channel; and receiving the MBMS services through an MBMS transmission channel based on the MBMS control information.

15 Claims, 4 Drawing Sheets

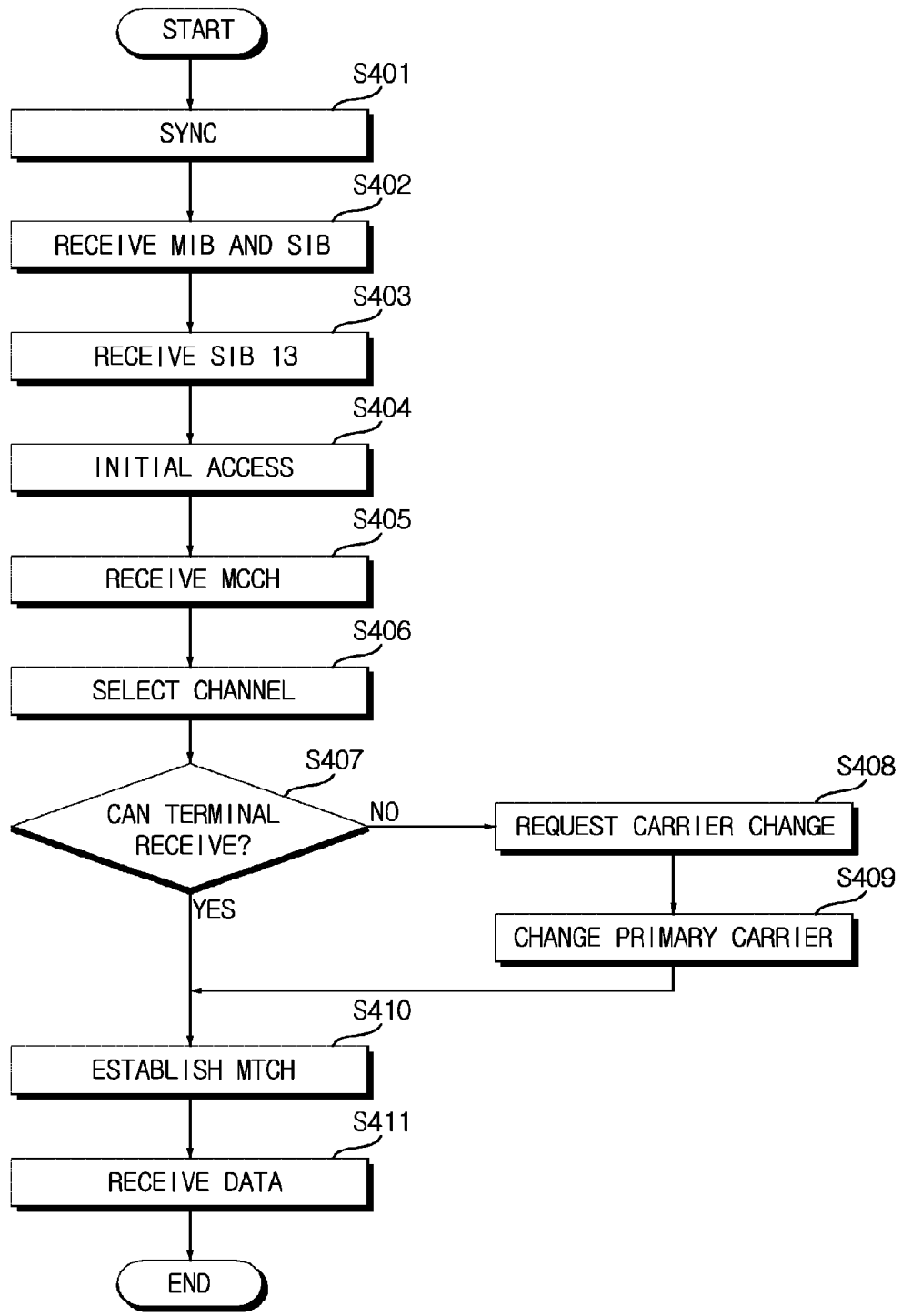

METHOD FOR RECEIVING AND TRANSMITTING MBMS SERVICE, TERMINAL FOR RECEIVING MBMS SERVICE, AND NETWORK FOR TRANSMITTING MBMS SERVICE

CROSS-REFERENCE TO RELATED APPLICATIONS

This application claims priority to and the benefit of Korean Patent Application No. 10-2010-0134093 filed in the Korean Intellectual Property Office on Dec. 23, 2010, the entire contents of which are incorporated herein by reference.

TECHNICAL FIELD

The present invention relates to a method and an apparatus for providing multimedia broadcast and multicast services (MBMS) in a mobile communication system supporting multi-carriers.

BACKGROUND ART

3GPP Release 6 according to the related art can support a multimedia broadcast and multicast service (MBMS) through several frequencies. To this end, there is provided a method for controlling wireless resources so as to select a frequency depending on a user priority for the MBMS service.

Recently, for a broadband of a mobile communication system, a carrier aggregation function using several carriers is applied to a 4G system. In the case of 3GPP, the carrier aggregation function is defined from Release 10 standard for the LTE-Advanced System. When a single base station uses multi-carriers, in the case of a terminal using unicast services, the base station can provide services by defining a carrier aggregation method and the number of carriers that can be provided to the terminal according to the performance of the terminal.

However, when there is a need to transmit multicast/broadcast (MBMS service) so that all the terminals can receive the multicast/broadcast, there is no method of detecting characteristics of each of the terminals receiving the MBMS service. Therefore, carrier information on each service is needed for all various types of terminals having one or several carriers to receive the multicast/broadcast; however, a method for providing the information has not yet been proposed.

SUMMARY OF THE INVENTION

The present invention has been made in an effort to provide MBMS services to both a terminal supporting a single carrier and a terminal supporting several carriers by receiving the MBMS services according to carrier receiving capability of the terminals.

An exemplary embodiment of the present invention provides a method for receiving MBMS services from a base station supporting multi-carriers, including: receiving first system information including information on all the carriers; receiving second system information including information on multi-carriers supported by the base station; receiving MBMS control information through an MBMS control channel; and receiving the MBMS services through an MBMS transmission channel based on the MBMS control information.

The information on the carriers may be multimedia broadcast multicast service single frequency network (MBSFN) area information.

The method may further include determining whether the terminal is possible to receive a carrier when a user selects a channel, and the determining whether the terminal is possible to receive the carrier may include requesting a change to the receivable carrier if it is determined that the terminal is not possible to receive the carrier of the selected channel.

The requesting of the carrier change may be performed by transmitting an MBMS request message through a common control channel (CCCH).

Another exemplary embodiment of the present invention provides a method for transmitting MBMS services in a network supporting multi-carriers, including: transmitting a message including carrier information supporting MBMS to a multi-cell coordination entity (MCE); starting an MBMS session; and receiving scheduling information including an MBSFN area carrier index from an MCE.

The message including the carrier information may be an M2Setup request message or an eNB configuration update message.

The method may further include establishing an MTCH after receiving the scheduling information and may further include performing scheduling for each carrier after establishing the MTCH.

Another exemplary embodiment of the present invention provides a method for transmitting MBMS services in a network supporting multi-carriers, including: receiving a message including carrier information supporting an MBMS in a base station; assigning a carrier index for each MBSFN area; and transmitting scheduling information including the carrier index to a base station.

Another exemplary embodiment of the present invention provides a terminal receiving MBMS services from a network supporting multi-carriers, including: a receiver receiving first system information including MBSFN area information on all the carriers and receiving second system information including MBSFN area information on carriers supported by a base station.

Another exemplary embodiment of the present invention provides a base station transmitting MBMS services in a network supporting multi-carriers, including: a transmitter transmitting a message including carrier information supporting an MBMS to an MCE; and a receiver receiving scheduling information including a carrier index for each MBSFN area from the MCE.

Another exemplary embodiment of the present invention provides a multi-cell coordination entity (MCE) transmitting MBMS services in a network supporting multi-carriers, including: a receiver receiving a message including carrier information supporting an MBMS in a base station; and a transmitter transmitting scheduling information including a carrier index for each MBSFN region to a base station.

The exemplary embodiments of the present invention have the following effects.

First, the terminal can receive the MBMS services using one and several carriers from the base station supporting the multi-carriers.

Second, when being transmitted by the multi-carriers, the larger MBMS service capacity can be assigned than when being transmitted by the single carrier.

Third, the exemplary embodiments of the present invention can be applied to both cases of using the MBMS dedicated carrier or the mixed carrier.

Fourth, all the multi-carrier supportable information of the base station is transmitted to the MCE at the initialization procedure and the carrier for each service is assigned in the MCE to change the carrier according to the capability of the base station or the terminal, thereby receiving the desired service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a diagram showing a procedure in which the terminal according to the exemplary embodiment of the present invention receives the MBMS services by accessing the base station supporting the multi-carriers.

Figure 1:
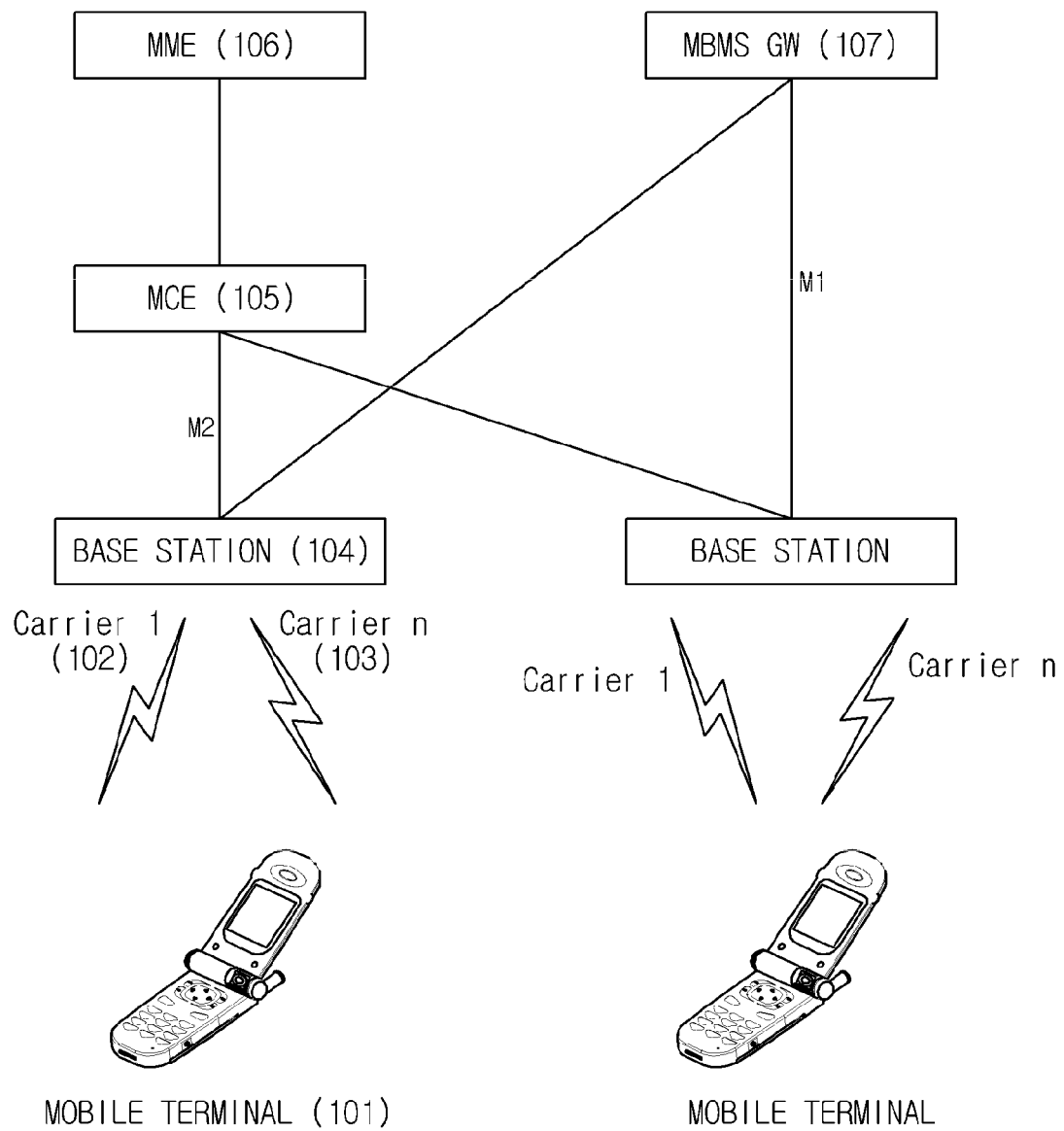
FIG. 1 is a configuration diagram of a mobile communication system supporting multi-carriers according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention may be implemented by various means. For example, the exemplary embodiments of the present invention may be implemented firmware, software, or a combination thereof, or the like.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various units.

Throughout the specification, when a predetermined portion is described to be "connected to" another portion, it includes a case where the predetermined portion is electrically connected to the other portion by disposing still another predetermined portion therebetween, as well as a case where the predetermined portion is directly connected to the other portion. Also, when the predetermined portion is described to include a predetermined constituent element, it indicates that unless otherwise defined, the predetermined portion may further include another constituent element, not precluding the other constituent element.

Also, the term module described in the present specification indicates a single unit to process a predetermined function or operation and may be configured by hardware or software, or a combination of hardware and software.

Specific terms are provided to help understandings of the present invention. The use of the specific terms may be changed into other forms without departing from the technical idea of the present invention.

Exemplary embodiments of the present invention relate to a method of transmitting and receiving MBMS services using multi-carriers. The exemplary embodiments of the present invention are configured to be able to receive the corresponding services assigned to the multi-carriers when a terminal supports multi-carriers by assigning carriers for each service and receive the corresponding service assigned to a single carrier when the terminal supports only the single carrier.

Hereinafter, exemplary embodiments of the present invention will be described in detail with reference to the accompanying drawings.

FIG. 1 is a configuration diagram of a mobile communication system supporting a multi-carrier according to an exemplary embodiment of the present invention.

Referring to FIG. 1, a mobile communication system supporting multi-carriers is configured to include terminals 101, a base station 104 supporting multi-carriers, a multi-cell coordination entity (MCE) 105 that is an entity coordinating multi-cells, a mobility management entity (MME) 106, and an MBMS gate way (GW) 107.

The base station 104 according to the exemplary embodiment of the present invention may support several carriers, that is, multi-carriers so as to increase wireless capacity.

The terminal 101 according to the exemplary embodiment of the present invention may simultaneously access a single carrier or multi-carriers according to the capability thereof.

The base station 104 may use multi-carriers even when transmitting the MBMS services. In this case, as the carriers supported for the MBMS, both an MBMS dedicated carrier 102 and a mixed carrier 103 may be applied.

The MCE 105 according to the exemplary embodiment of the present invention serves to manage the same scheduling information in the multi-cells within a multimedia broadcast multicast service single frequency network (MBSFN) area. The MBSFN transmits signals at the same frequency from the multi-cells and thus, the terminal is recognized as a single cell. When the MBSFN areas are several, the MCE 105 assigns the scheduling information for each MBSFN area and informs the base station of the assigned scheduling information.

The MME 106 according to the exemplary embodiment of the present invention performs mobility management and idle mode management for the terminal and transmits an MBMS related session control message generated from a broadcast-multicast service center (BM-SC) controlling MBMS bearers to a mobile communication access network.

Meanwhile, the MBMS GW 107 according to the exemplary embodiment of the present invention forwards and routes MBMS user data.

An M2 interface is used between the MCE 105 and the base station 104 and an M1 interface is used between the base station 104 and the MBMS GW 107.

Figure 2:
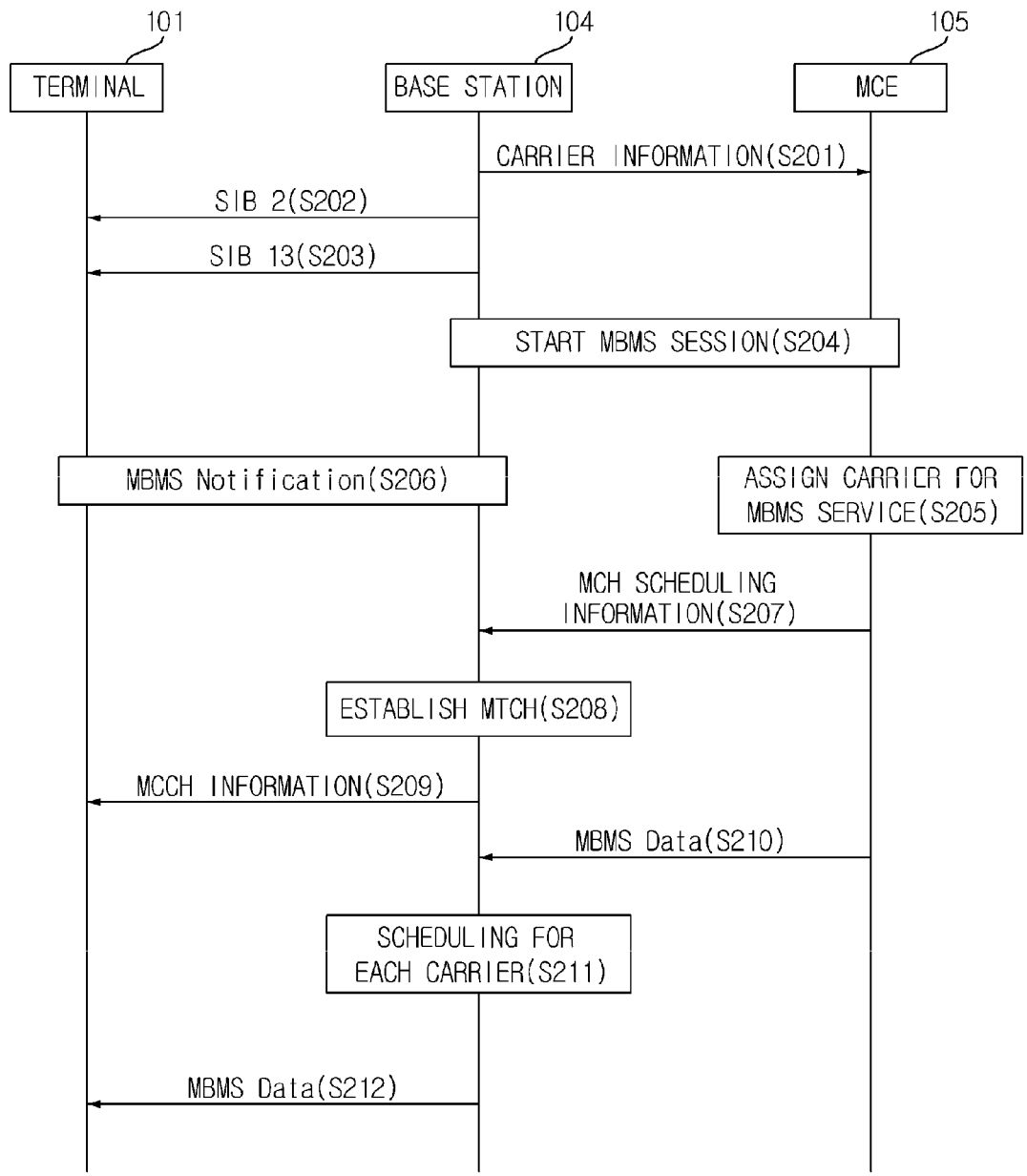
FIG. 2 is a diagram showing a control procedure of MBMS services supporting the multi-carriers according to the embodiment of the present invention.

FIG. 2 is a diagram showing a control procedure of MBMS services supporting multi-carriers according to the embodiment of the present invention.

Referring to FIG. 2, the MBMS service control procedure according to the exemplary embodiment of the present invention includes an initialization process and an MEMS session process.

The initialization process, which is a process of allowing the base station 104 to share the carrier information used for the MBMS together with the MCE 105 and the terminal 101, will be described in detail.

First, the base station 104 transmits the carrier information capable of supporting the MBMS to the MCE 105 (S201). Since the MCE 105 needs to know whether the base station 104 supports the multi-carriers, the carrier information is transmitted during the initialization process.

In this case, the carrier information may be included in the specific message, and the used message may be an M2Setup request message or an eNB configuration update message that is defined in 3GPP TS 36.443 specifications.

As a method for including carrier information in an M2AP message, carriers may be assigned for each MBSFN area within an MBSFN area list that is included in an eNB configuration data item of the M2Setup request message or the eNB configuration update message. This is to expand to a method for supporting the multi-carriers with reference to an M2 application protocol (M2AP) message that has been used in the related art.

The message may also include characteristic information on carriers such as the MBMS dedicated carrier, the mixed carrier, or the like.

In the MCE, the carriers for the MBMS service are assigned based on the carrier information for each MBSFN area included in the received message.

Meanwhile, the base station 104 periodically transmits an SIB2 to the terminal 101 (S202). The SIB2, which is a portion of a system information block, is an RRC message and is transmitted to the terminal 101 through a broadcast channel (BCH).

The SIB2 includes the MBSFN area information for all the carriers that may be assigned by the base station 104. In addition, the base station 104 periodically broadcasts the MBSFN area information on the specific carriers, that is, the multi-carriers that may be assigned by the base station to another portion of the system information block, that is, an SIB 13 (S203).

The terminal 101 reads the SIB2 and the SIB13 to obtain the multi-carrier information and the related MBSFN information that are supported by the base station 104 to which the terminal 101 accesses. Next, the MBMS session process will be described after the initialization procedure.

The MBMS session start procedure includes QoS information on the corresponding MBMS service (S204). When the MBMS session starts, the MCE 105 needs to generate the scheduling information on the MBMS service. In this case, the carriers for each MBSFN area are assigned based on the QoS information on the corresponding session (S205).

The carrier assignment information for each MBSFN area is included in the MCH scheduling information to be transmitted to the base station 104 (S207). The carrier assignment information may be configured by a carrier index.

In the base station 104 supporting the multi-carriers, an MBMS notification procedure (S206) for corresponding service activation is performed after the MBMS session start procedure, which is informed through all the carriers.

The base station 104 performs the MTCH establishment including the carrier information on the corresponding service based on the MCH scheduling information (S208).

Next, the MBSFN area information is included in the MCCH information and is broadcast through the MCH of all the carriers (S209).

Thereafter, the MBMS data are transmitted to the base station 104 from the MCE 105 (S210). The base station 104 performs a scheduling for each carrier on the corresponding MBMS service based on the previously received MCH scheduling information (S211).

The base station 104 transmits the MBMS data through the PMCH of the corresponding carrier according to the scheduling (S212).

Figure 3:
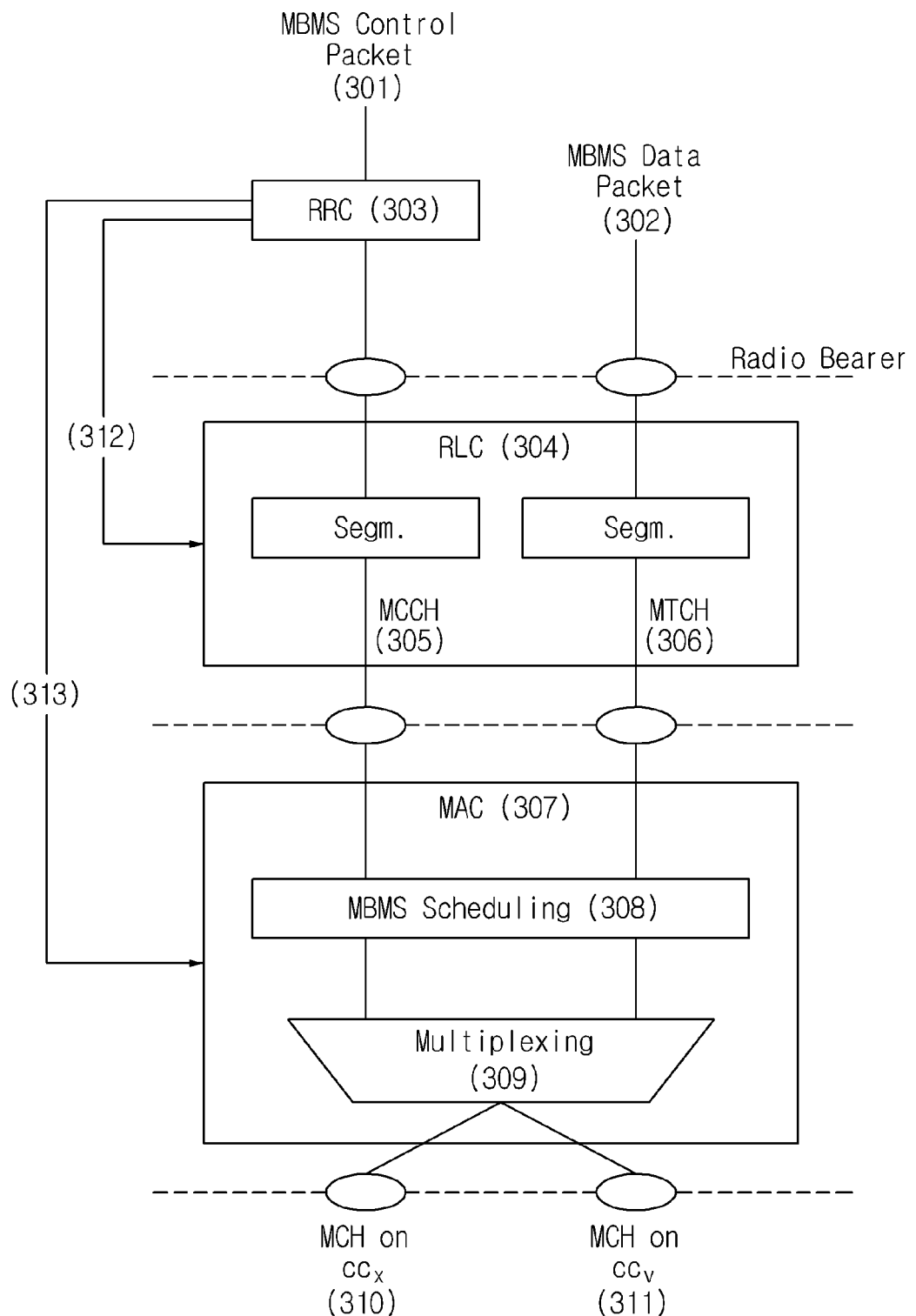
FIG. 3 is a diagram showing an inter-layer logical structure diagram of a base station supporting the multi-carriers according to the exemplary embodiment of the present invention.

FIG. 3 is a diagram showing an inter-layer logical structure diagram of a base station supporting the multi-carriers according to the exemplary embodiment of the present invention.

Referring to FIG. 3, the MBMS service is performed through the transmission of an MBMS control packet 301 and an MBMS data packet 302.

The hierarchy of the base station is configured to include an RRC 303 for controlling the wireless resources, an RLC 304 for controlling a wireless link, an MAC 307 for mapping a logical channel with a transmission channel, and PHYs 310 and 311 transmitting data in a predetermined format.

The RRC 303 controls the wireless resources for the MBMS services and receives the control message generated by the MCE (not shown) to perform the function of establishing/releasing the wireless resource information of the RLC 304, the MAC 307, and the PHYs 310 and 311 that are the sub-layer based on the information.

The RLC 304 is connected with the MAC 307 that is the sub-layer through an MCCH 305 and an MTCH 306 which are MBMS control channels. A service data unit (SDU) is converted into a protocol data unit (PDU) by performing a segment function that divides the MBMS data packet into a predetermined size.

In the MAC 307, the MCCH 305 and the MTCH 306 are scheduled by the MBMS scheduling 308 function and are multiplexed (309) for each carrier, and then are transmitted to the terminal through the MCH of each CC 310 and 311.

The RRC 303 serves to establish or release the wireless resource information to or from the RLC/MAC/PHY based on the MBMS scheduling information created by the MCE (not shown).

In order to establish the wireless resource information, a CRLC-MBMS-CONFIG-REQ 312 and a CMAC_MBMS_CONFIG-REQ 313 are transmitted. In this case, when the base station supports the multi-carriers, the CMAC-MBMS-CONFIG-REQ 313 message includes a carrier component index parameter transmitted by the MCE at the time of establishing the MTCH or the MTCH and thus, is scheduled as the carrier component index information established for the corresponding radio bearer at the time of the MBMS scheduling 308 in the MAC 307.

FIG. 4 is a diagram showing a procedure in which the terminal according to the exemplary embodiment of the present invention receives the MBMS services by accessing the base station supporting the multi-carriers.

Referring to FIG. 4, the terminal first synchronizes (SYNC) with the base station at the physical (PHY) layer (S401). That is, the terminal receives a synchronization channel to synchronize with the base station.

Next, the terminal periodically receives the MIB and the SIB through the BCH so as to acquire the system information (S402). In this case, the terminal can be informed that the base station can support the multi-carriers.

Thereafter, the terminal receives the SIB13 including the MBSFN information for each carrier so as to receive the MBMS service (S403).

The terminal may receive one or several carriers through the initial access procedure (S404).

Next, the terminal completing the initial access receives the MCCH that is the MBMS control channel (S405).

In this case, a specific MBMS channel providing the MBMS service desired by the user is selected (S406). After the channel is selected, it is determined whether the terminal is possible to receive the carrier of the selected channel (S407). In order to determine whether the terminal is possible to receive the carrier, it is confirmed whether the service corresponding to the channel selected by the terminal is in any carrier. In the state where the terminal cannot receive the carriers of the service selected by the terminal, for example, when the corresponding service is transmitted to the multi-carriers and the terminal does not support the multi-carriers, the carrier change procedure is performed for moving to the carrier of the selected screen.

First, the terminal generates the RRC message (for example, MBMS request) for access change to the carrier corresponding to the channel selected by the terminal and transmits the generated RRC to the base station (S408).

The carrier change request message may be transmitted through the common control channel (CCCH) so that the carrier change request message may be used in both the idle state and the connected state of the terminal.

The base station receives the change request message and then, changes a primary carrier of the terminal (S409).

Thereafter, the base station receives the broadcast data of the corresponding channel by performing the MTCH establishment (S410) on the selected channel (S411). The user can see the received broadcast data on the screen of the terminal.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations, and other uses and applications which do not depart from the spirit and scope of the invention are deemed to be covered by the invention which is limited only by the claims which follow.

What is claimed is:

1. A method for receiving multimedia broadcast and multicast service (MBMS) services from a base station supporting multi-carriers, comprising:
    receiving first system information including information on all the carriers;
    receiving second system information including information on multi-carriers supported by the base station;
    receiving MBMS control information through an MBMS control channel; and
    receiving the MBMS services through an MBMS transmission channel based on the MBMS control information.

2. The method of claim 1, wherein the first system information or the second system information on the carriers is multimedia broadcast multicast service single frequency network (MBSFN) area information.

3. The method of claim 1, further comprising:
    determining whether a terminal receiving the MBMS services is possible to receive a carrier when a user selects a channel.

4. The method of claim 3, wherein the determining whether the terminal is possible to receive the carrier includes requesting a change to the carrier of the channel selected by the user if it is determined that the terminal is not possible to receive the carrier of the channel selected by the user.

5. The method of claim 4, wherein the requesting of the change to the carrier of the channel selected by the user is performed with an MBMS request message.

6. The method of claim 5, wherein the MBMS Request message is transmitted through a common control channel (CCCH).

7. A method for transmitting MBMS services in a network supporting multi-carriers, comprising:
    transmitting a message including carrier information supporting MBMS to a multi-cell coordination entity (MCE);
    starting an MBMS session; and
    receiving scheduling information including aft MBSFN area carrier index from the MCE.

8. The method of claim 7, wherein the message including the carrier information is a setup request message to interface between an evolved universal terrestrial radio access network node B (eNB) and the MCE.

9. The method of claim 7, wherein the message including the carrier information is an eNB configuration update message.

10. The method of claim 7, further comprising:
    establishing a multicast traffic channel (MTCH) after receiving the scheduling information.

11. The method of claim 10, further comprising:
    performing scheduling for each carrier after establishing the MTCH.

12. A method for transmitting MBMS services in a network supporting multi-carriers, comprising:
    receiving a message including carrier information supporting an MBMS in a base station;
    assigning a carrier index for each MBSFN area; and
    transmitting scheduling information including the carrier index to the base station.

13. A terminal receiving MBMS services from a network supporting multi-carriers, comprising:
    a receiver receiving first system information including MBSFN area information on all carriers and receiving second system information including the MBSFN area information on carriers supported by a base station.

14. A base station transmitting MBMS services in a network supporting multi-carriers, comprising:

a transmitter transmitting a message including carrier information supporting an MBMS to an MCE; and a receiver receiving scheduling information including a carrier index for each MBSFN area from the MCE.

15. A multi-cell coordination entity (MCE) transmitting MBMS services in a network supporting multi-carriers, comprising:

a receiver receiving a message including carrier information supporting an MBMS in a base station; and a transmitter transmitting scheduling information including a carrier index for each MBSFN region to the base station.

\* \* \* \* \*